United States Patent [19]
Paik et al.

[11] Patent Number: 5,371,179
[45] Date of Patent: Dec. 6, 1994

[54] POLYSUCCINIMIDE POLYMERS AND PROCESS FOR PREPARING POLYSUCCINIMIDE POLYMERS

[75] Inventors: Yi H. Paik, Princeton, N.J.; Ethan S. Simon, Ambler; Graham Swift, Blue Bell, both of Pa.

[73] Assignee: Rohm and Haas Company, Philadelphia, Pa.

[21] Appl. No.: 911,862

[22] Filed: Jul. 10, 1992

[51] Int. Cl.$^5$ .................. C08G 69/00; C08G 69/10
[52] U.S. Cl. .................. 528/363; 528/310; 528/328
[58] Field of Search .............. 528/363, 328, 310

[56] References Cited

U.S. PATENT DOCUMENTS

| | | | |
|---|---|---|---|
| 2,306,918 | 12/1942 | Weiss et al. | 528/345 |
| 3,052,655 | 9/1962 | Fox et al. | 528/328 |
| 3,474,083 | 10/1969 | Shiga et al. | 528/328 |
| 3,846,380 | 11/1974 | Fujimoto et al. | 528/328 |
| 3,923,751 | 12/1975 | Iwashita et al. | 528/328 |
| 4,590,260 | 5/1986 | Harada et al. | 528/328 |
| 4,839,461 | 6/1989 | Boehmke | 528/363 |
| 5,057,597 | 10/1991 | Koskan | 528/328 |
| 5,219,952 | 6/1993 | Koskan et al. | 525/419 |
| 5,296,578 | 3/1994 | Koskan et al. | 528/363 |

FOREIGN PATENT DOCUMENTS

| | | |
|---|---|---|
| 699394 | 4/1969 | Japan . |
| 528873 | 3/1977 | Japan . |
| 1230319 | 4/1971 | United Kingdom . |

OTHER PUBLICATIONS

ACS Symposium Series (Ring-Opening Polymerization, International Symposium), vol. 59, Mar., 1977, Wash., DC pp. 233–250 H. K. Reimschuessel 'Isomerization Polymerization of Lactams' p. 237, table 2: ex. 6.
Journal of Polymer Science: Part A-1, vol. 9, Sep. 1971 pp. 2717–2725 K. P. Klein et al. 'Studies on Substituted Lactams (I)' p. 2722, para. 5, p. 2719.
Polymers for Advance Technologies, vol. 1, no. 5/6, Oct. 1990, Chichester, Susses, pp. 275–285 M. De L. Machado et al., 'Water-soluble Polyamides as Potential Drug Carriers, IV: Amine-functionalized Copolyaspartamides' p. 282, left column.

*Primary Examiner*—John Kight, III
*Assistant Examiner*—P. Hampton Hightower
*Attorney, Agent, or Firm*—James G. Vouros; David T. Banchik

[57] ABSTRACT

Polysuccinimide polymers of from about 5 to 100 percent by weight of methylenesuccinimide moieties, and from 0 to about 95 percent by weight of one or more amino acid moieties are provided. A process is provided for preparing polysuccinimide polymers by forming a polymerization mixture of poly(alkylene glycol), ammonia, one or more monoethylenically unsaturated poly(carboxylic acids) and, optionally, one or more other monoethylenically unsaturated compounds; heating the mixture to an elevated temperature; and maintaining the mixture at the elevated temperature to form polysuccinimide polymers.

34 Claims, No Drawings

POLYSUCCINIMIDE POLYMERS AND PROCESS FOR PREPARING POLYSUCCINIMIDE POLYMERS

FIELD OF THE INVENTION

This invention relates to polysuccinimide polymers, particularly polymethylenesuccinimide and copolymers thereof, and to a process for preparing polysuccinimide polymers including polymethylenesuccinimide, polysuccinimide and copolymers thereof.

BACKGROUND OF THE INVENTION

Several methods are known for obtaining polysuccinimide, which when hydrolyzed to form the corresponding poly(amino acid) is useful as an absorbent, hard-surface cleaner, water-treatment additive for boiler waters and cooling towers and as a detergent additive acting as a builder, anti-filming agent, dispersant, sequestering agent and encrustation inhibitor. However, all of the previously known methods for preparing polysuccinimide suffer from the drawbacks of excessively long process times, expensive starting materials, or require the handling of solid materials which poses many difficulties in a manufacturing environment.

U.S. Pat. No. 5,057,597 to Koskan discloses a solid-phase process for preparing polysuccinimide by fluidizing an amino acid with agitation in a nitrogen atmosphere at a temperature of at least 180° C. for three to six hours. The resultant polysuccinimide is then hydrolyzed to form a poly(amino acid).

U.S. Pat. No. 4,839,461 to Boehmke, et al. discloses a process for preparing poly(aspartic acid) by combining maleic acid or maleic anhydride and an ammonia solution in a molar ratio of 1:1–1.5. The mixture is then heated to 120°–150° C. and the resulting solution of ammonium salt and maleic acid is evaporated, leaving a crystal mash. The crystal mash is then melted, during which time the waters of condensation and crystallization distill off. A porous mass of poly(aspartic acid) results. The entire process requires six to eight hours to complete.

Japanese Patent 52-0088773 B assigned to Ajinomoto, discloses a solvent-based process for the preparing poly(aspartic acid). The process described therein utilizes a hydrohalic acid salt of aspartic acid anhydride in one or more organic solvents. The solvents disclosed are organic acids such as propionic acid, butyric acid, and valeric acid; alcohols such as tert-butyl alcohol and ted-amyl alcohol, esters such as ethyl acetate and butyl acetate; ketones such as methyl isobutyl ketone and cyclohexanol; ethers such as tetrahydrofuran and dioxane; halogenated hydrocarbons such as ethylene dichloride and dichlorobenzene; hydrocarbons such as toluene, xylene and decalin; and amides such as dimethylformamide. These solvents may impart additional hazards, expense, odor, toxicity and removal steps to obtain the final product.

The prior art methods for the synthesis of polysuccinimides and poly(amino acids) are time consuming, complex or use large volumes of volatile organic solvents or inert gases. As used hereinafter and in the appended claims, "polysuccinimide polymers" refers to polymeric materials which contain succinimide moieties, including methylenesuccinimide moieties, in the polymer chain and may contain other moieties, and "polysuccinimide" refers to polymeric materials which contain only such moieties. "Methylenesuccinimide moieties" as used hereinafter refers to methylenesuccinimide radicals at the terminus of a polymer chain (i.e. connected to the polymer chain by one covalent bond) and methylenesuccinimide radicals in the interior of a polymer chain (i.e. connected to the polymer chain by more than one covalent bond). Similarly, "amino acid moieties," as used hereinafter refers to amino acid radicals, including the anhydrous form of amino acid radicals, at the terminus of a polymer chain and amino acid radicals in the interior of a polymer chain.

It is an object of the present invention to provide polysuccinimide polymers, particularly polymethylenesuccinimide, and copolymers thereof.

It is a further object of the present invention to provide a solvent process for producing polysuccinimide polymers.

It is a further object of the present invention to provide a method of preparing poly(aspartic acid) which does not utilize aspartic acid as a starting material.

It is a further object of the present invention to provide a solvent process for producing polysuccinimide polymers which does not require a product separation step.

SUMMARY OF THE INVENTION

The present invention provides polysuccinimide polymers of
(a) from about 5 to 100 percent by weight of methylenesuccinimide moieties, and
(b) from 0 to about 95 percent by weight of one or more amino acid moieties; wherein the sum of (a) and (b) is 100.

The present invention further provides a process for preparing polysuccinimide polymers by:
a) forming a polymerization mixture of poly(alkylene glycol), ammonia, one or more monoethylenically unsaturated poly(carboxylic acids) and, optionally, one or more other monoethylenically unsaturated compounds;
b) heating the mixture to an elevated temperature; and
c) maintaining the mixture at the elevated temperature to form polysuccinimide polymers.

DETAILED DESCRIPTION OF THE INVENTION

The polysuccinimide polymers of the present invention include polymethylenesuccinimide of from about 5 to 100 percent by weight of methylenesuccinimide moieties. Methylenesuccinimide moieties which are radicals in the interior of a polymer chain (i.e. connected to the polymer chain by more than one covalent bond) have the structural formula:

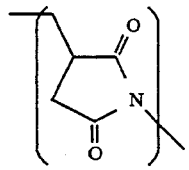

Upon hydrolysis, the ring structure of the methylenesuccinimide moieties may open to yield either the α- or β- substituted methyleneaspartic acid moieties. Methylenesuccinimide moieties are incorporated into the polysuccinimide polymers by incorporating into the polymerizing mixture itaconic acid, itaconic anhydride, or the amic acid thereof. The amic acid of itaconic anhydride may be formed in situ in the process of the present invention in the presence of ammonia or other amine. In one preferred embodiment of the present invention, the polysuccinimide polymer is 100 percent by weight methylenesuccinimide moieties.

The polysuccinimide polymers of the present invention may also include from 0 to about 95 percent by weight of one or more amino acid moieties. Preferred amino acid moieties are radicals, including anhydrous radicals, of alanine, glycine, lysine, asparagine aspartic acid and glutamic acid. Preferably, the one or more amino acid moieties comprise from about 5 to about 80 percent by weight, and most preferably from about 5 to about 50 percent by weight of the polysuccinimide polymers.

The process of the present invention for preparing polysuccinimide polymers, including polymethylenesuccinimide, includes forming a polymerization mixture of one or more monoethylenically unsaturated poly(carboxylic acids). The monoethylenically unsaturated poly(carboxylic acids) include maleic acid, mesaconic acid, fumaric acid, methylenemalonic acid, itaconic acid, citraconic acid, aconitic acid, alkylmaleic acids, alkenylsuccinic acids, monoethylenically unsaturated oligomers of poly(acrylic acid) and poly(methacrylic acid), and butene-1,3,4-tricarboxylic acid and anhydrides of any of the aforementioned acids. Other suitable monoethylenically unsaturated poly(carboxylic acids) include the partial and complete esters of the monoethylenically unsaturated poly(carboxylic acids) such as monomethyl maleate, dimethyl maleate, monomethyl itaconate and dimethyl itaconate. Salts of the monoethylenically unsaturated poly(carboxylic acids) can also be used such as the partial or complete ammonium salts or the partial alkali metal salts. Suitable partial and complete ammonium salts include monoammonium maleate and diammonium maleate. Partial alkali metal salts of the monoethylenically unsaturated poly(carboxylic acids) include monosodium maleate and monopotassium maleate. The preferred monoethylenically unsaturated poly(carboxylic acids) are itaconic anhydride, itaconic acid, maleic anhydride, maleic acid, and the monoammonium salts thereof.

The poly(alkylene glycols) useful in the present invention are those which are fluid at the reaction temperature. Suitable poly(alkylene glycols) include poly(tetramethylene glycol), poly(ethylene glycol), and poly(propylene glycol). The poly(alkylene glycol) can also be terminated at one or both ends by carboxylic acids, alkyl groups of from 1 to 30 carbon atoms, or amines, or alkylamines of from 1 to 10 carbon atoms, or any combination thereof. Preferably the poly(alkylene glycol) is diethylene glycol, poly(ethylene glycol), methyl-terminated poly(ethylene glycol), or poly(propylene glycol). The molecular weight of the poly(alkylene glycol) is up to about 30,000, preferably from about 300 to about 20,000, and most preferably from about 1,000 to about 15,000.

The one or more other monoethylenically unsaturated compounds which can be incorporated into the polymerization mixture include monoethylenically unsaturated monocarboxylic acids containing from three to six carbon atoms and the ammonium salts thereof, such as acrylic acid, methacrylic acid, crotonic acid and the ammonium salts thereof. The one or more other monoethylenically unsaturated compounds which can be incorporated into the polymerization mixture can also be monoethylenically unsaturated carboxyl-free compounds including $C_1$-$C_4$ alkyl esters of acrylic or methacrylic acids such as methyl acrylate, ethyl acrylate, butyl acrylate, methyl methacrylate, ethyl methacrylate, butyl methacrylate and isobutyl methacrylate; hydroxyalkyl esters of acrylic or methacrylic acids such as hydroxyethyl acrylate, hydroxypropyl acrylate, hydroxyethyl methacrylate, and hydroxypropyl methacrylate. The one or more other monoethylenically unsaturated compounds which can be incorporated into the polymerization mixture can also be acrylamide and methacrylamide. Preferably, the one or more other monoethylenically unsaturated compounds is acrylic acid, methacrylic acid and the ammonium salts thereof.

The ammonia is introduced into the polymerization mixture as a gas or as a solution. When the ammonia is introduced into the polymerization mixture as a solution, it is preferred that the solution be as concentrated as possible. The ammonia can be dissolved in water to form an aqueous solution of ammonium hydroxide, or it can be dissolved in alcohols such as methanol, ethanol or propanol, or any other suitable organic solvent. It is also desirable to add the ammonia to the polymerization mixture by dissolving it in the poly(alkylene glycol).

The one or more monoethylenically unsaturated poly(carboxylic acids) are added to the polymerization mixture at a level of from about 10 to 98 percent by weight relative to the poly(alkylene glycol), preferably from about 20 to about 90, and most preferably from about 30 to about 85 percent by weight relative to the poly(alkylene glycol). The poly(alkylene glycol) is added to the polymerization mixture at a level of from 2 to about 90 percent by weight relative to the monoethylenically unsaturated poly(carboxylic acid), preferably from about 20 to about 90, and most preferably from about 30 to about 85 percent by weight relative to the monoethylenically unsaturated poly(carboxylic acid). The one or more other monoethylenically unsaturated compounds are added to the polymerization mixture at a level of from 0 to about 95 percent by weight relative to the one or more monoethylenically unsaturated poly(carboxylic acids), preferably from about 5 to about 80, and most preferably from about 5 to about 50 percent by weight relative to the one or more monoethylenically unsaturated poly(carboxylic acids). Ammonia is added to the polymerization mixture at a level sufficient to provide a molar ratio of ammonia to carboxylic acid of from about 0.5-10:1, preferably from about 1.0-5.0:1, and most preferably from about 0.9-2.5:1.

The atmosphere of the polymerization is preferably substantially free of oxygen, including the oxygen present in air. An atmosphere substantially free of oxygen is preferred since, at the temperatures needed for the polycondensation reaction to occur, the poly(alkylene glycols) will oxidize, discolor or degrade. Suitable means for achieving an atmosphere substantially free of oxygen is by blanketing, sweeping or bubbling the reactor with an inert gas, preferably nitrogen, or conducting the polymerization at reduced pressure.

The elevated temperature for the process of the present invention must be high enough to provide polycondensation. The preferred temperature will vary with the operating conditions. For example, the preferred temperature may increase as the ratio of monoethylenically unsaturated poly(carboxylic acids) to poly(alkylene glycol) increases, or as the pressure at which the polycondensation is conducted increases. However, the preferred temperature may decrease, for example, in the presence of azeotropic solvents. In general, the preferred elevated temperature is from about 120 to about 250° C.

The polysuccinimide polymers are formed by a condensation reaction. It is therefore desirable to remove the by-products, such as water or alcohol, which are liberated in order to drive the reaction toward completion. Suitable means of removing water include addition of one or more azeotropic solvents to the polymerization mixture such as toluene, xylene, or tetralin, and removing the azeotropic distillate from the polymerization mixture. Another means of removing the water is by adding to the polymerization mixture one or more drying agents such as aluminosilicates. Another means of removing the water is by bubbling an inert gas through the polymerization mixture, or sweeping an inert gas over the surface of the polymerization mixture. Another means of removing the water is by conducting the polymerization under reduced pressure.

The polymerization can be conducted as a batch or continuous process. Suitable reactors include batch tank reactors, continuous stirred tank reactors, plug-flow reactors, pipe reactors and scraped-wall reactors. The temperature of the reaction must be sufficient to drive off the water which is liberated in the condensation reaction. This temperature will vary according to whether an azeotropic solvent is employed and the pressure at which the polymerization is conducted which can be subatmospheric, atmospheric or supraatmospheric.

The product which results from the process of the present invention is a solution, suspension or dispersion of polysuccinimide polymers in poly(alkylene glycol). Poly(alkylene glycols) are useful in many of the applications for the polysuccinimides such as, for example, in detergent formulations. Thus, there is no need for a separation step to isolate the polysuccinimide polymers from the poly(alkylene glycol) when the product is used in a detergent application. If desired, the polysuccinimide polymers can be hydrolyzed by any conventional means to form the corresponding poly(amino acid) such as poly(aspartic acid) or poly(methyleneaspartic acid). A preferred means of hydrolysis is by contacting the product with an aqueous alkaline solution such as sodium hydroxide.

EXAMPLE 1

Preparation of Polysuccinimide

To a 500 milliliter three-neck round bottom flask equipped with a mechanical stirrer and condenser was added 42.0 grams of maleic anhydride (0.428 moles) and 98.0 grams of polyethylene glycol having a molecular weight of 3350 (0.029 moles). The flask was immersed in an oil bath. The contents of the flask were stirred and the temperature was raised to 75°-80° C. After thirty minutes at this temperature, 25.14 grams of 29 percent by weight aqueous solution of ammonium hydroxide (0.428 moles) was added dropwise. The ammonium hydroxide was added slowly to avoid loss of ammonia by evolution of gas. After the addition of the ammonium hydroxide was complete, the flask was fitted with a Dean Stark condensing trap and a nitrogen sweep was begun. The contents of the flask were heated to a reaction temperature of 200° C. over 1 hour and maintained at that temperature for 1.5 hours then cooled to room temperature.

EXAMPLE 2

The same procedure was followed as in Example 1 except 50.31 grams (0.858 moles) of ammonium hydroxide solution were used; the contents of the flask were heated to a reaction temperature of 170° C. over 50 minutes and maintained at that temperature for 4 hours.

EXAMPLE 3

The same procedure was followed as in Example 1 except 29.4 grams (0.30 moles) of maleic anhydride, 29.8 grams (0.009 moles) of polyethylene glycol, and 34.3 grams (0.601 moles) of ammonium hydroxide solution were used; the contents of the flask were heated to a reaction temperature of 150° C. over 30 minutes and maintained at that temperature for 3 hours.

EXAMPLE 4

The same procedure was followed as in Example 1 except 98.0 grams (1.00 moles) of maleic anhydride, 42.0 grams (0.013 moles) of polyethylene glycol, and 117.45 grams (2.00 moles) of ammonium hydroxide solution were used; the contents of the flask were heated to a reaction temperature of 160° C. over 1 hour and maintained at that temperature for 1.5 hours.

EXAMPLE 5

The same procedure was followed as in Example 1 except 29.9 grams (0.302 moles) of maleic anhydride, 29.9 grams (0.006 moles) of polyethylene glycol methyl ether having molecular weight of 5,000, and 35.5 grams (0.622 moles) of ammonium hydroxide solution were used; the contents of the flask were heated to a reaction temperature of 170° C. over 1 hour and maintained at that temperature for 3 hours.

EXAMPLE 6

The same procedure was followed as in Example 1 except 23.4 grams (0.200 moles) of maleic acid, 23.5 grams (0.007 moles) of polyethylene glycol, and 23.2 grams (0.406 moles) of ammonium hydroxide solution were used; the contents of the flask were heated to a reaction temperature of 200° C. over 50 minutes and maintained at that temperature for 3 hours.

EXAMPLE 7

To a 100 milliliter three-neck round bottom flask equipped with a magnetic stirrer, Dewar condenser, and an inlet and outlet for nitrogen was added 5.0 grams of maleic anhydride (50 millimoles) and 5.0 grams of polyethylene glycol having a molecular weight of 3350. The flask was purged with nitrogen and immersed in an oil bath maintained at 70° C. The contents of the flask were stirred and the mixture became clear and homogeneous. The Dewar condenser was filled with dry ice and acetone. 1.2 liters (50 millimoles) of ammonia gas were bubbled into the contents of the flask over 3.75 minutes. After the addition of the ammonia was complete, a nitrogen sweep was begun. The contents of the flask were heated to a reaction temperature of 150°-160° C., maintained at that temperature for 3 hours then cooled to room temperature.

EXAMPLE 8

Preparation of Polymethylenesuccinimide

The same procedure was followed as in Example 1 except 25.9 grams (0.197 moles) of itaconic acid, 25.9 grams (0.008 moles) of polyethylene glycol, and 11.3 grams (0.198 moles) of ammonium hydroxide solution were used; the contents of the flask were heated to a reaction temperature of 200° C. over 1 hour and maintained at that temperature for 3 hours.

We claim:

1. A polymer comprising: (a) from about 5 to 100 percent by weight of recurring units of the formula

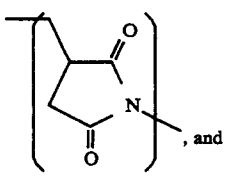

, and (b) from 0 to about 95 percent by weight of one or more α-amino acid moieties; wherein the sum of (a) and (b) is 100.

2. The polymer of claim 1 wherein (a) is 100 percent by weight of the polymer.

3. The polymer of claim 1 wherein the one or more α-amino acid moieties are selected from the group consisting of radicals of alanine, glycine, aspartic acid and glutamic acid.

4. The polymer of claim 1 wherein the one or more α-amino acid moieties is a radical of aspartic acid.

5. The polymer of claim 1 wherein (b) is from about 5 to about 80 percent by weight of the polymer.

6. The polymer of claim 1 wherein (b) is from about 5 to about 50 percent by weight of the polymer.

7. A process for preparing a polymer comprising:
   a) forming a polymerization mixture of poly(alkylene glycol), ammonia, one or more monoethylenically unsaturated poly(carboxylic acids) and one or more other monoethylenically unsaturated compounds;
   b) heating the mixture to an elevated temperature; and
   c) maintaining the mixture at the elevated temperature to form the polymer solution, suspension or dispersion in the poly(alkylene glycol).

8. The process of claim 7, wherein the poly(alkylene glycol) is selected from the group consisting of: poly(tetramethylene glycol); poly(ethylene glycol); poly(propylene glycol); poly(tetramethylene glycol) terminated at one or both ends by carboxylic acids, alkyl groups of from 1 to 30 carbon atoms, amines, or alkylamines of from 1 to 10 carbon atoms; poly(ethylene glycol) terminated at one or both ends by carboxylic acids, alkyl groups of from 1 to 30 carbon atoms, amines, or alkylamines of from 1 to 10 carbon atoms; poly(propylene glycol) terminated at one or both ends by carboxylic acids, alkyl groups of from 1 to 30 carbon atoms, amines, or alkylamines of from 1 to 10 carbon atoms; and combinations thereof.

9. The process of claim 7, wherein the poly(alkylene glycol) is selected from the group consisting of diethylene glycol, poly(ethylene glycol), methyl-terminated poly(ethylene glycol), and poly(propylene glycol).

10. The process of claim 7, wherein the poly(alkylene glycol) is poly(ethylene glycol).

11. The process of claim 7, wherein the polymerization mixture contains poly(alkylene glycol) at a level of from 2 to about 90 percent by weight relative to the monoethylenically unsaturated poly(carboxylic acid).

12. The process of claim 7, wherein the polymerization mixture contains poly(alkylene glycol) at a level of from about 20 to about 90 percent by weight relative to the monoethylenically unsaturated poly(carboxylic acid).

13. The process of claim 7, wherein the polymerization mixture contains poly(alkylene glycol) at a level of from about 30 to about 85 percent by weight relative to the monoethylenically unsaturated poly(carboxylic acid).

14. The process of claim 7, wherein the one or more monoethylenically unsaturated poly(carboxylic acids) are selected from the group consisting of maleic acid, mesaconic acid, fumaric acid, itaconic acid, methylenemalonic acid, citraconic acid, aconitic acid, alkylmaleic acids, alkenylsuccinic acids, monoethylenically unsaturated oligomers of poly(acrylic acid), monoethylenically unsaturated oligomers of poly(methacrylic acid), butene-1,3,4-tricarboxylic acid, and anhydrides, partial esters, complete esters, partial ammonium salts, complete ammonium salts, and partial alkali metal salts thereof.

15. The process of claim 7, wherein the one or more monoethylenically unsaturated poly(carboxylic acids) are selected from the group consisting of maleic acid, maleic anhydride, mesaconic acid, fumaric acid, methylenemalonic acid, itaconic acid, itaconic anhydride, citraconic acid, aconitic acid, alkylmaleic acids, alkenylsuccinates, monoethylenically unsaturated oligomers of poly(acrylic acid), monoethylenically unsaturated oligomers of poly(methacrylic acid), and butene-1,3,4-tricarboxylic acid, monomethyl maleate, dimethyl maleate, monomethyl itaconate, dimethyl itaconate, monoammonium maleate, diammonium maleate, monosodium maleate and monopotassium maleate.

16. The process of claim 7, wherein the one or more monoethylenically unsaturated poly(carboxylic acids) are selected from the group consisting of maleic acid, maleic anhydride, itaconic acid, itaconic anhydride, and the monoammonium salts thereof.

17. The process of claim 7, wherein the one or more monoethylenically unsaturated poly(carboxylic acids) are selected from the group consisting of itaconic acid, itaconic anhydride, and the monoammonium salts thereof.

18. The process of claim 7, wherein the one or more monoethylenically unsaturated poly(carboxylic acids) are selected from the group consisting of maleic acid, maleic anhydride, and the monoammonium salts thereof.

19. The process of claim 7, wherein the polymerization mixture contains one or more monoethylenically unsaturated poly(carboxylic acids) at a level of from about 10 to 98 percent by weight relative to the poly(alkylene glycol).

20. The process of claim 7, wherein the polymerization mixture contains one or more monoethylenically unsaturated poly(carboxylic acids) at a level of from about 20 to about 90 percent by weight relative to the poly(alkylene glycol).

21. The process of claim 7, wherein the polymerization mixture contains one or more monoethylenically unsaturated poly(carboxylic acids) at a level of from about 30 to about 85 percent by weight relative to the poly(alkylene glycol).

22. The process of claim 7, wherein the one or more other monoethylenically unsaturated compounds are selected from the group consisting of monoethylenically unsaturated monocarboxylic acids containing from three to six carbon atoms and the ammonium salts thereof, $C_1$-$C_4$alkyl esters of acrylic acid, $C_1$-$C_4$alkyl esters of methacrylic acids, hydroxyalkyl esters of acrylic acid, hydroxyalkyl esters of methacrylic acid, acrylamide and methacrylamide.

23. The process of claim 7, wherein the one or more other monoethylenically unsaturated compounds are selected from the group consisting of acrylic acid, methacrylic acid, crotonic acid, and the ammonium salts thereof; methyl acrylate, ethyl acrylate, butyl acrylate, methyl methacrylate, ethyl methacrylate, butyl methacrylate and isobutyl methacrylate; hydroxyethyl acrylate, hydroxypropyl acrylate, hydroxyethyl methacrylate, and hydroxypropyl methacrylate; acrylamide and methacrylamide.

24. The process of claim 7, wherein the one or more other monoethylenically unsaturated compounds are selected from the group consisting of acrylic acid, methacrylic acid and the ammonium salts thereof.

25. The process of claim 7, wherein the polymerization mixture contains one or more other monoethylenically unsaturated compounds at a level of from 0 to about 95 percent by weight relative to the poly(alkylene glycol).

26. The process of claim 7, wherein the polymerization mixture contains one or more other monoethylenically unsaturated compounds at a level of from about 5 to about 80 percent by weight relative to the poly(alkylene glycol).

27. The process of claim 7, wherein the polymerization mixture contains one or more other monoethylenically unsaturated compounds at a level of from about 5 to about 50 percent by weight relative to the poly(alkylene glycol).

28. The process of claim 7, wherein the polymerization mixture contains a molar ratio of ammonia to carboxylic acid of from about 0.5–10:1.

29. The process of claim 7, wherein the polymerization mixture contains a molar ratio of ammonia to carboxylic acid of from about 1.0–5.0:1.

30. The process of claim 7, wherein the polymerization mixture contains a molar ratio of ammonia to carboxylic acid of from about 0.9–2.5:1.

31. The process of claim 7 further comprising hydrolysing the polysuccinimide polymers to form the corresponding poly(amino acids).

32. The process of claim 7 wherein the mixture is maintained at the elevated temperature in an atmosphere substantially free of oxygen.

33. A process for preparing a polymer comprising:
a) forming a polymerization mixture of poly(alkylene glycol), ammonia, and one or more monoethylenically unsaturated poly(carboxylic acids);
b) heating the mixture to an elevated temperature; and
c) maintaining the mixture at the elevated temperature to form the polymer solution, suspension or dispersion in the poly(alkylene glycol).

34. A polymer comprising:
(a) from about 5 to 100 percent by weight of recurring units of the formula

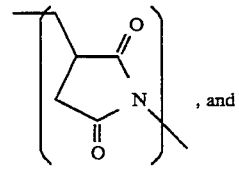

, and (b) from 0 to about 95 percent by weight of one or more amino acid moieties; wherein the sum of (a) and (b) is 100.

* * * * *